United States Patent [19]

Frost, Jr. et al.

[11] Patent Number: 4,586,137
[45] Date of Patent: Apr. 29, 1986

[54] METHOD FOR GENERATING VARIABLE WELL LOGGING DATA COMPOSITES

[75] Inventors: Elton Frost, Jr.; Martin T. Evans, both of Houston, Tex.

[73] Assignee: Dresser Industries, Inc., Dallas, Tex.

[21] Appl. No.: 434,814

[22] Filed: Oct. 18, 1982

[51] Int. Cl.[4] .............................................. G01V 1/40
[52] U.S. Cl. .................................... 364/422; 367/25; 367/33
[58] Field of Search .................... 181/102; 324/323; 340/860; 364/422; 367/25, 33, 59, 60, 63, 73, 34, 69, 74, 40

[56] References Cited

U.S. PATENT DOCUMENTS

| | | | |
|---|---|---|---|
| 3,065,454 | 11/1962 | Moore | 367/59 |
| 3,348,193 | 10/1967 | Kerr | 367/63 |
| 4,012,712 | 3/1977 | Nelligan | 340/857 |
| 4,040,002 | 8/1977 | Durand | 340/860 |
| 4,276,599 | 6/1981 | Timmons et al. | 340/860 |
| 4,312,040 | 1/1982 | Tinch et al. | 364/422 |
| 4,320,469 | 3/1982 | Frawley et al. | 367/33 |
| 4,321,670 | 3/1982 | Timmons | 364/300 |
| 4,482,959 | 11/1984 | Minne | 324/323 |
| 4,484,278 | 11/1984 | Edmundson | 364/422 |

OTHER PUBLICATIONS

Minicomputer Field Taping and Computing System by Guy O. Buckner Research and Development Project for Dresser Atlas, Houston, Tex., SPWLA Symposium 1972.

Primary Examiner—Salvatore Cangialosi
Assistant Examiner—K. R. Kaiser
Attorney, Agent, or Firm—Patrick H. McCollum; Richard M. Byron

[57] ABSTRACT

Method for generating a composite logging data base from two separate historical data bases in a form suitable for further on-site computerized analysis and processing. A generalized system is provided for automatically producing, as a function of a plurality of elected options, an output which is either a merger of logging curves from the two data bases, a replacement of one or more logging curves or portions thereof from one data base with those of a correlative curve or curves from the second data base, or a splice of one or more logging curves from one data base derived over one borehole increment with a curve or curves from the second data base derived over a different borehole increment, with further provision for automated renaming and reordering of curves as they appear in the output as well as compatibility checks between the two data bases thus being combined in terms of logging parameters and borehole increments as a function of the elected option.

14 Claims, 11 Drawing Figures

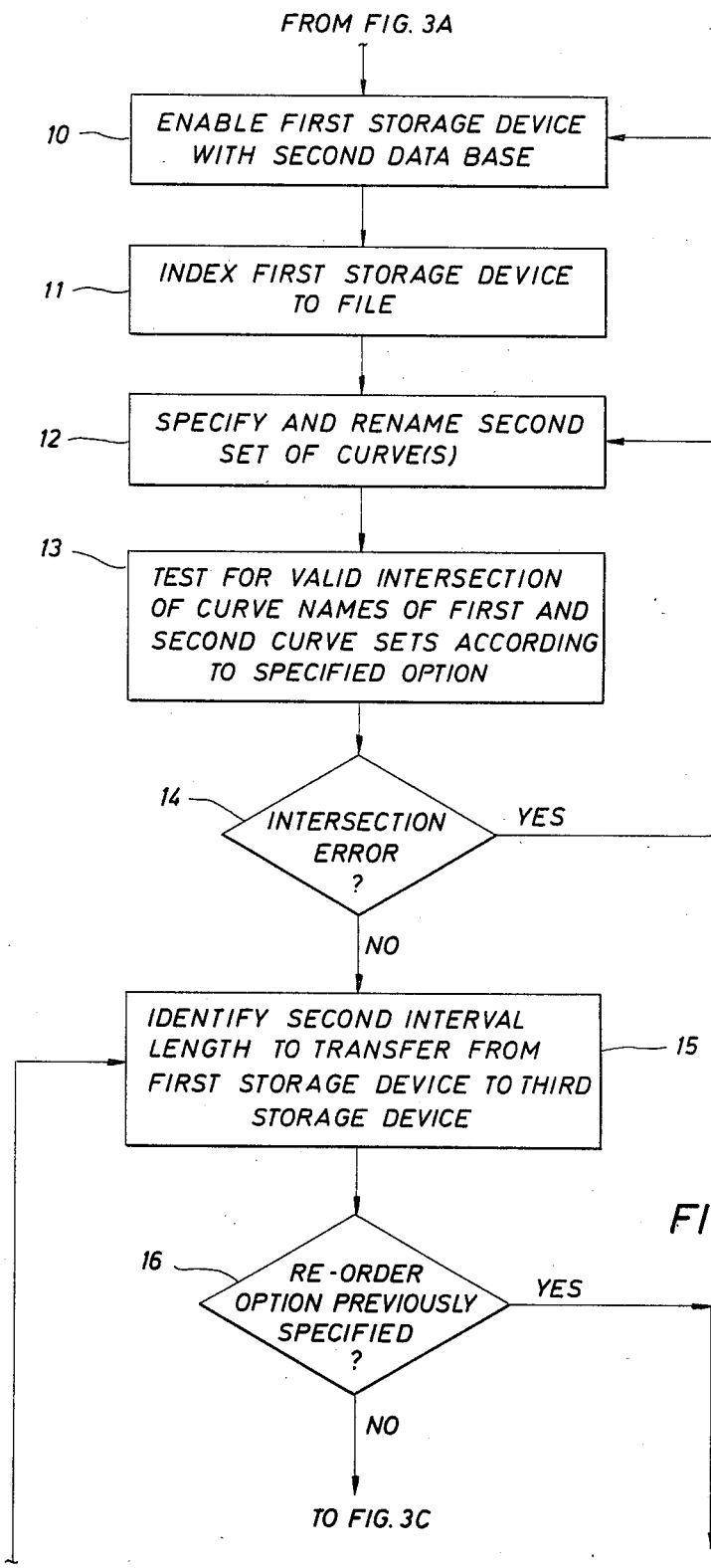

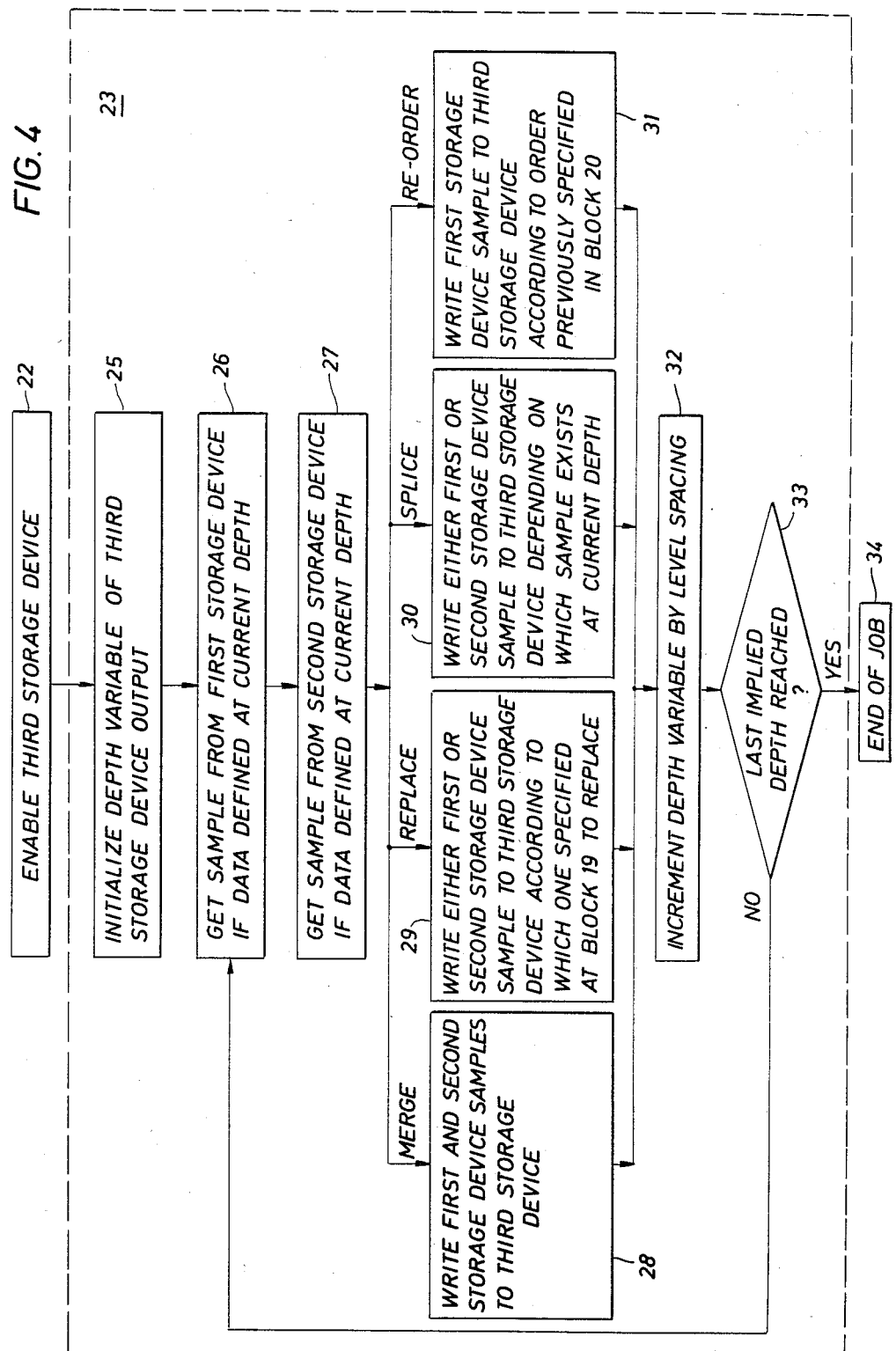

METHOD FOR GENERATING VARIABLE WELL LOGGING DATA COMPOSITES

FIELD OF THE INVENTION

This invention relates to methods for generating well logging data. More specifically, this invention relates to techniques for automatically generating a variety of composites of logging data from two or more separate historical logging data bases in a form suitable for further on-site computerized analysis and processing.

BACKGROUND OF THE INVENTION

It is frequently desirable in the well logging art to provide means for combining logging data from two separate and distinct data base sources, which may correspond to digital logging tapes from separate logging operations, into one convenient composite form for purposes of display, further analysis, data processing, and the like.

For example, during one pass through the borehole, one logging tool of a multiple-tool string may fail or yield erroneous data either throughout the entire logging operation or in part over a particular increment of borehole resulting in loss of data. It may be desirable to replace this lost data with data from another logging run and tape. Thus, the valid data residing in the first logging tape and the replacement data on the other logging tape (derived during a different pass through a borehole and corresponding to the same logging parameter data over the borehole increment in which data from the first tape was determined to be erroneous or non-existent) will be retrieved and stored as a composite in a third tape.

As yet another example, logging data is at times derived during separate logging operations over respectively different increments of borehole and stored in separate logging tapes corresponding to the respective logging operations. It may thus be desirable to electronically and functionally splice the data together into a single output file or tape, thereby providing a composite of logging data over the combined borehole increments of the two logging operations.

As yet a third example, in some cases logging parameters are derived during one pass through the borehole which differ from those derived during a different pass and it is desirable for purposes of analysis and the like to merge the data from the two logging operations together into the aforementioned single composite output tape whereby, for example, at a given borehole elevation all of the parameters derived by both logging operations are available. Such derivation of differing parameters during separate logging operations may be due to a number of reasons such as size constraints on the logging string preventing tools for measuring all desired parameters being interconnected for one pass through the borehole, similar constraints regarding tool combination compatibilities, and the like.

Techniques have been available for performing the aforementioned functions of replacing, splicing, or merging digitized logging data from two logging tapes into a single convenient output tape, however these techniques have suffered from serious problems, particularly with respect to field applications wherein wellsite production of composite tapes is particularly desirable.

One of the drawbacks with the prior techniques was that typically separate and distinct programs were provided for performing each of the aforementioned functions of merging, splicing, or replacing of logging data at a computing center remote from the wellsite to which digitized well logging tapes were routed for such processing from the field after the logging operation. Accordingly, no provision was made for a generalized and automated program and method, simplified for difficult field environments, for combining these separate data sets or logging tapes into a composite form on one output tape or file at the wellsite, wherein one of a plurality of such composites such as merging, splicing, or replacing, could be elected on-site and immediately produced from the general program without the need for locating, loading, and the like of separate and distinct programs for performing the particular compositing function elected.

Yet another problem with providing a generalized system for performing one of a variety of compositing functions such as the aforementioned merging, splicing, or replacing, is that differing constraints arise with respect to compatibility of parameters and borehole increments selected from each of the two data bases for compositing, dependent upon the particular option elected.

For example, in the case of replacing data of one data set with data from the remaining data set, it is obviously required that the replacement data and data to be replaced be derived over identical borehole elevations and that the data from the two data sets correspond to identical logging parameters. On the other hand, with respect to the functional splicing of one data set to that of another data set, as also previously described, while it is readily apparent that it is desirable for the logging parameters to be identical for which data is to be spliced, it is further generally desirable that the logging parameter data from the two data sets to be spliced not overlap with respect to the increments of borehole over which they were derived. This is due to the fact that the splice option involves appending one set of logging data derived over one borehole increment in tandem fashion with that of another data set derived over a different borehole increment.

Finally, due to the aforementioned function of the merging operation in which it is desired to develop a composite logging tape comprised of logging parameters derived over a given borehole increment residing in one tape with different parameters derived over the same borehole increment residing in another tape, while an overlapping of such borehole increments is desirable, it is not desirable to permit identical parameters to be selected for merging from each of the data sets in that two measurements of the same logging parameter would thus appear in the output tape at the same borehole elevation.

It can thus be appreciated that it was highly desirable to provide a generalized system for providing composites of logging data from two logging data sets wherein the particular composite was selectively variable from a plurality thereof including merge, replace, and splice options. Yet, it can further be appreciated from the foregoing, that, due to the variety of differing constraints as to compatibility of parameters and borehole increments of the two data sets, which vary as a function of the particular option selected, there was a further need for such a system which could automatically adapt to the type of composite desired, to insure compatibility checks were selected as a function of the particular composite option selected.

The disadvantages of the prior art including those hereinabove recited are overcome by the method for generating variable well logging data composites of the present invention.

SUMMARY OF THE INVENTION

In methods for generating well logging data at wellsite in accordance with the present invention, first, second and third storage devices and a user input console, such as a teletype keyboard or the like, are interconnected to an appropriate central processing unit (CPU), all of which are preferably disposed within the logging truck. In a preferred embodiment, the first and third storage devices are suitable digital tape drives, whereas the third such device may preferably take the form of a digital disk drive.

A first well logging data base comprised of one or more previously derived and digitized logging curves residing on a first tape is loaded onto the first drive, and, in response to commands from the console and CPU, a portion or all of one or more such curves is transferred to disk storage.

A second such data base, also comprised of one or more previously derived and digitized logging curves residing on a second tape, is then loaded onto the first drive. In response to a generalized program of the present invention and an option pre-specified prior to loading of the first data set but after program loading by means of the disk drive, the CPU will then selectively retrieve logging data from the first tape and disk drives, outputting the composite result to the second tape drive in a format to be described which is adapted for further processing of the composite data.

Means are provided for electing from a plurality of options, prior to derivation of the composite output data, whether such data is to be a merging of at least a portion of one or more logging curves from one data base with at least a portion of one or more logging curves from the other data base, a replacing of at least a portion of one or more logging curves from one data base with corresponding portions of like curves from the other data base over a specified common borehole increment, a splicing at least a portion of one or more logging curves from one data base derived over a first borehole increment with at least a portion of one or more logging curves from the second data base derived over at least a different increment of borehole, or a reordering of the sequence of curves of the first data base as they will appear in the output of the second tape deck.

Means are further provided for automatically testing for compatibility of selected curves and borehole increments thereof between the first and second data bases as a function of the elected option of merge, replace, or splice.

It is, therefore, an object of the present invention to provide improved methods for deriving a composite of well logging data from two or more data bases.

It is another object of this invention to provide a generalized and automated method for selectively merging, replacing, splicing, or reordering of well logging data curves.

It is yet a further object of the present invention to provide an automatic compatibility check of selected well logging curve parameters and borehole increments between two well logging data sets as a function of a plurality of user-specified data base combination options.

These and other advantages and objects of the invention can be understood from the following detailed description of methods for generating variable well logging data composites described in conjunction with the drawings wherein:

DESCRIPTION OF THE DRAWINGS

FIGS. 3A–3C constitute a flow chart functionally depicting the operation of the present invention.

FIG. 4 is an expanded portion of the flow chart of FIG. 3.

DETAILED DESCRIPTION OF THE EMBODIMENT

Referring first to FIGS. 1A–1F, it will be recalled from the foregoing that in well logging operations it is frequently desirable to develop at the wellsite a data base in a format adapted for further processing at wellsite which is a composite of two or more separate data bases, each of which may be comprised of digitized well logging data generated during two or more distinct passes through the borehole. Thus, for purposes of illustration, there may be seen depicted in FIG. 1A a schematic representation of digitized well logging data comprising a first data base from a first borehole pass, such data including measurements of logging parameters represented by logging curves A, B, and C derived over increments of borehole depth between 1,000 and 2,000 feet and such data further being conveniently stored in the form of a first digital tape in accordance with various techniques well known in the art.

Figure 1:
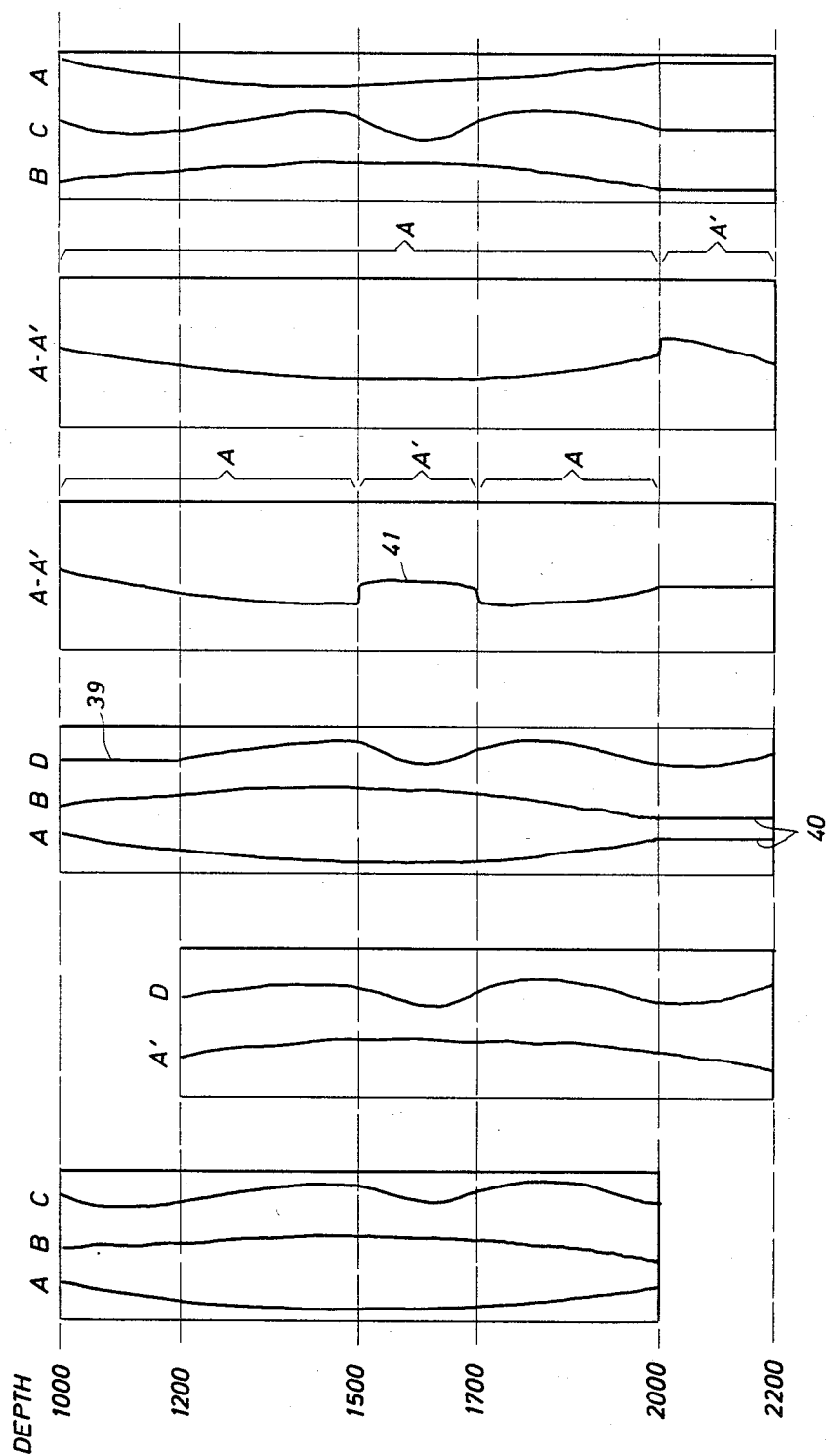
FIGS. 1A–1F are schematic representations of well logging data, illustrating the variable composite operations performed by the present invention.

In like manner, referring to FIG. 1B, there will be seen a second schematic representation of digitized well logging data comprising a second data base of logging curves A' and D, derived over a borehole depth of 1,200 to 2,200 feet, such data preferably being stored in the form of a second digital tape. In the present illustration, the significance of the prime designation in the A' log of FIG. 1B is that the parameter being measured and recorded is equivalent to that of curve A of FIG. 1A, the difference being that the logging curve A' of FIG. 1B was derived and stored in the second data base aforementioned and from a different borehole pass from that of FIG. 1A.

The purpose of FIGS. 1C–1F are to schematically depict the typical data composites of the present invention which are desired in the field and which represent various combinations and rearrangements of the data represented in the data bases of FIG. 1A and FIG. 1B. It will be noted, however that the figures are intended merely to serve as schematic representations, and that, in reality, such combinations and rearrangements, in accordance with the present invention, will be delivered by the CPU to the third storage device and preferably stored thereby in the form of a third composite digital tape.

Referring more particularly to the merge operation of FIG. 1C, it will be appreciated that it is frequently desirable to combine together into one composite output two distinct sets of logging curve data each of which may represent logging parameters differing from those of the remaining set. For example, with reference to FIG. 1A, there will be seen logging curves A and B which may represent a resistivity and porosity measurement, respectively, derived over the indicated borehole increment. In like manner, in FIG. 1B, logging curve D may be seen which represents a logging parameter different from that of curve A and C of FIG. 1A. However, it may be highly desirable to have available in one data base logging parameters A and B as well as D for purposes of study, including further data processing, of functional relationships employing the parametric data represented by curves A, B and D.

Thus, referring to FIG. 1C, which is a schematic representation of the merge operation, it will be seen that logging curves A and B of FIG. 1A have been combined with logging curve D of FIG. 1B. While it is not essential that there be overlap in depth at which all of the combined parameters were derived, such overlapping of the interval between 1,200 and 2,000 between curves A and B of FIG. 1A and curve D of FIG. 1B have been shown in FIG. 1C to illustrate one of the desirable aspects of merge capability, namely the availability of differing parameter data from two or more data sets at the same increments of borehole in the same data base for functional studies. It will be noted from curve segments 39 and 40 of FIG. 1C, however, that in the instances in which data is not available for a curve at a specified borehole depth, a "dummy" value may appropriately be substituted.

It will further be noted in passing, that although curve D of FIG. 1B may in reality represent a parameter identical to that of one of the other curves with which it will be merged (in the present example, curve A, B or C of FIG. 1A), such identical parameter curves may be nevertheless merged if desired by simply redesignating one of the identical parameter curve names. Thus, if, for example, it was desirable to merge logging curves A and A' of FIGS. 1A and 1B, respectively, either logging curve A or A' may be re-designated with a curve name different from that of the remaining curves with which it is to be merged.

Referring now to FIG. 1D, the replace function of the present invention is thereby illustrated in schematic form. In this option, it is frequently desirable to replace a portion of curve data derived over a preselected increment of borehole residing in a first data base and corresponding digital tape with data corresponding to the same logging parameter also derived over that increment of borehole but residing in a second data base and tape, and to output the composite result in a convenient form to the aforementioned third tape for further processing or analysis. This may be desirable, for example, in cases in which there was tool failure corresponding to a particular parameter over that borehole increment during one pass wherein it is further desirable to have one logging curve data file for the parameter covering the entire borehole range of interest. Thus, it will be noted from curve segment 41 of FIG. 1D that it corresponds to a like curve segment of curve A' generated between 1,500 and 1,700 feet depicted in FIG. 1B, and that this segment 41 of curve A' has replaced data of logging curve A of FIG. 1A generated over the same borehole increment.

Referring now to FIG. 1E, there may be seen a schematic representation of the splice function of the present invention, wherein it is desirable to combine into one data base or output file one or more logs derived over one borehole interval residing in one data base with one or more logs of a corresponding parameter from a second data base derived over a different interval. More specifically, first logging curve data may have been derived over an increment of borehole between 1,000 and 2,000 feet, as in the example of FIG. 1A. In like manner, a different set of logging data may have been derived over a different such borehole increment which is not necessarily overlapping the first, as in the case of that of FIG. 1B, wherein the logging operation represented thereby generated data over a borehole increment between 1,200 and 2,200 feet.

A closer examination of FIG. 1E, schematically indicates that, in accordance with the present invention, one output data base has been generated which is a composite of the two previously described data bases of FIGS. 1A and 1B, whereby logging parameter curve data A is present with that of curve data A' of FIG. 1B derived over the non-overlapping borehole increment of 2,000 to 2,200 feet and "spliced" thereto.

While not an example of a combination of two or more logging data bases into one desired output file, for purposes of completeness the reorder feature of the present invention has further been described, as schematically depicted in FIG. 1F. It is frequently desirable in logging operations to present logging curve data in differing orders from that in which they appear in the original logging datasets or tapes. As but one example, in accordance with industry convention, although logging data of FIG. 1A may have been derived and stored in the order A, B, C, it may be desired to reorder presentation of such data in a final output form such as in the order B, C, A. Thus, with reference to FIG. 1F, it will be seen that the logging data output has been provided which is a reordering of that of FIG. 1A. This may be particularly desirable, for example, in the aforementioned case in which differing logging curve data from two sources, depicted in FIGS. 1A and 1B, are combined. Thus, referring again to FIG. 1C, it may be seen that in some instances it is not desirable to attain a composite output data tape dictated by the order of the curves of the two input data bases of FIG. 1A and 1B, and thus it may be desirable for logging curve D of FIG. 1B to appear in the merge of FIG. 1C, resulting in the order D, B, A prior to those of logging curves A and B of FIG. 1A. With the reordering feature of the present invention, such reordering is possible.

Figure 2:
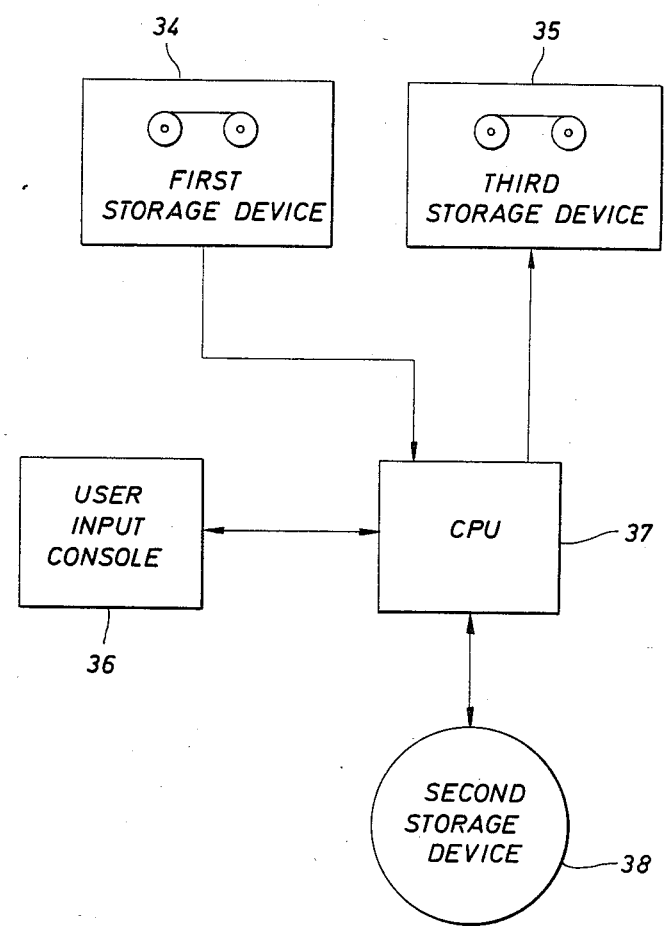
FIG. 2 is a functional block diagram of an apparatus for generating the various composite logging data bases in accordance with the present invention.

Referring now to FIG. 2, a simplified block diagram of the apparatus employed at wellsite for effecting the aforementioned features of the present invention may be seen depicted therein. Specifically, a central processing unit or CPU 37 is provided, which, in accordance with the present invention, preferably takes the form of a small general purpose digital computer or the like. Interconnected thereto is a first storage device 34, a second storage device 38, and a third storage device 35. Whereas such storage devices 34, 35, and 38, may take many forms in accordance with technology well known in the art, in the preferred embodiment herein described, storage devices 34 and 35 will preferably take the form of digital tape drives, whereas the second storage device 38 is frequently found to be more convenient in the form of a digital disk drive. Finally, with reference still to FIG. 2, a suitable user input console 36 is interconnected with CPU 37, and preferably takes the form of a teletype keyboard or the like for purposes of maintaining dialog between the operator and the system.

It will be recalled that it is a feature of the present invention to automatically combine logging data from two or more data bases into a composite third data base in accordance with a generalized program and plurality of composite options of the present invention, and that preferably all such data bases are conveniently initially stored in the form of digital tape as the logging measurements are derived. Whereas a more detailed description of the interrelationship between the various tapes and storage devices will be hereinafter set forth, for purposes of illustration a general overall description of operation of the apparatus of FIG. 2 will now be set forth.

First, an appropriate digital program for carrying out the steps of the invention described herein will be loaded into the disk drive 38 and stored. Next, a digital tape comprised of the first data set illustratively represented by FIG. 1A will be loaded on tape drive 34 and, in response to input from console 36 to be hereinafter described, at least a portion of the data stored therein will be delivered to the disk drive 38 in which it will be again stored. The first data set represented by the first digital tape will then be replaced by a next digital tape which, in like manner, is loaded on the tape drive 34 and corresponds to the second data set such as that depicted in FIG. 1B, and which is desired to be combined with the first data set thus stored in disk drive 38 to result in the composite third data set of the present invention.

Again, in response to input from console 36, CPU 37 will thereafter, under control of the digital program being executed which implements the steps of the present invention, commence retrieval of data from one data set residing in first storage device 34 and from the second data set residing in second storage device 38. As a result of such retrievals, output data will then be automatically delivered to tape drive 35 for storing on an appropriate digital tape, said output being comprised of data from at least portions of one or more logging curves of the first data set stored in first storage device 34 and/or the logging curve data from at least portions of one or more such curves stored in the second storage device 38, depending on the desired preselected data output composite function, whether it be merge, replace, splice, or reorder.

Figure 3A:
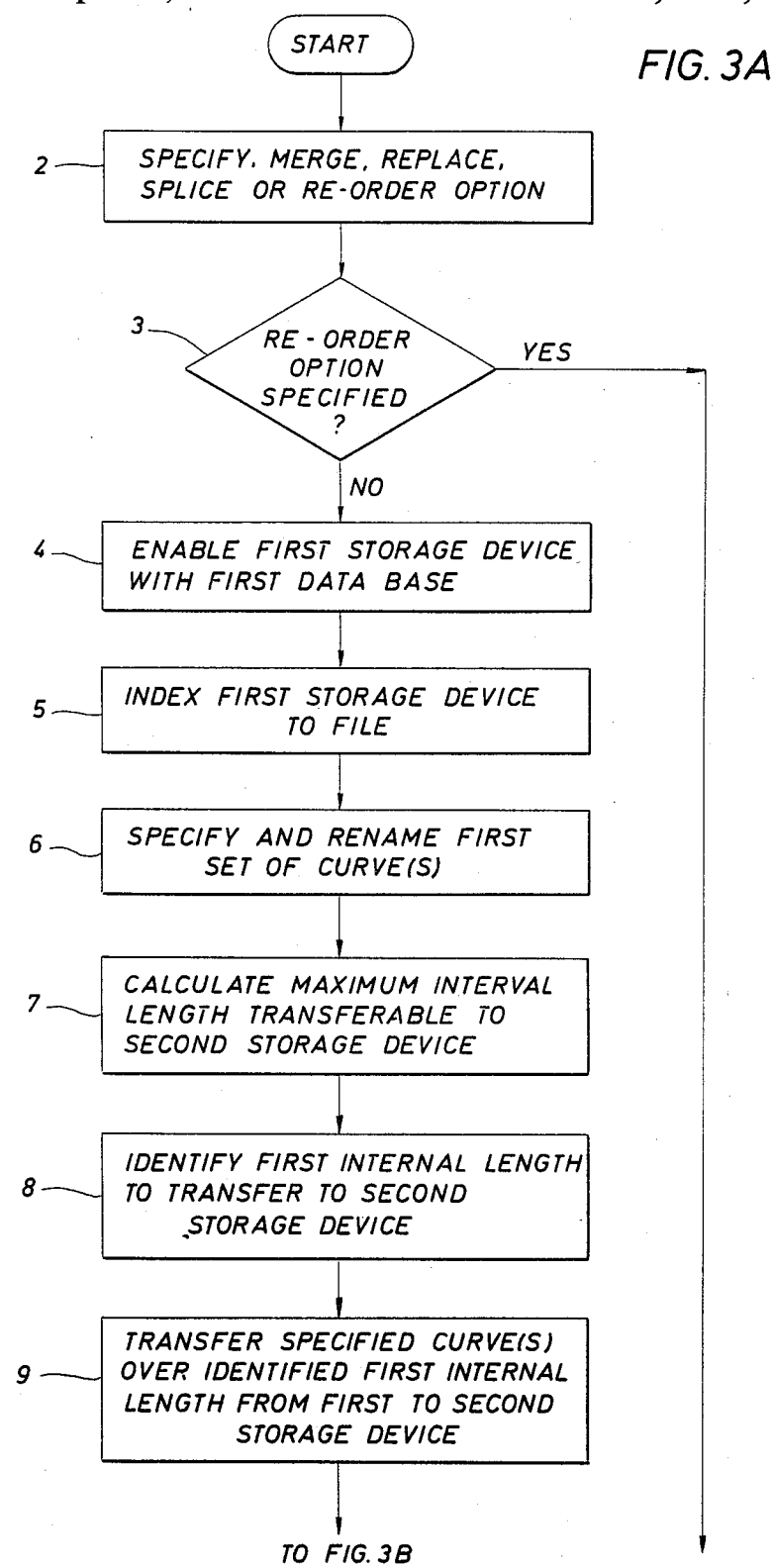
Figure 3C:
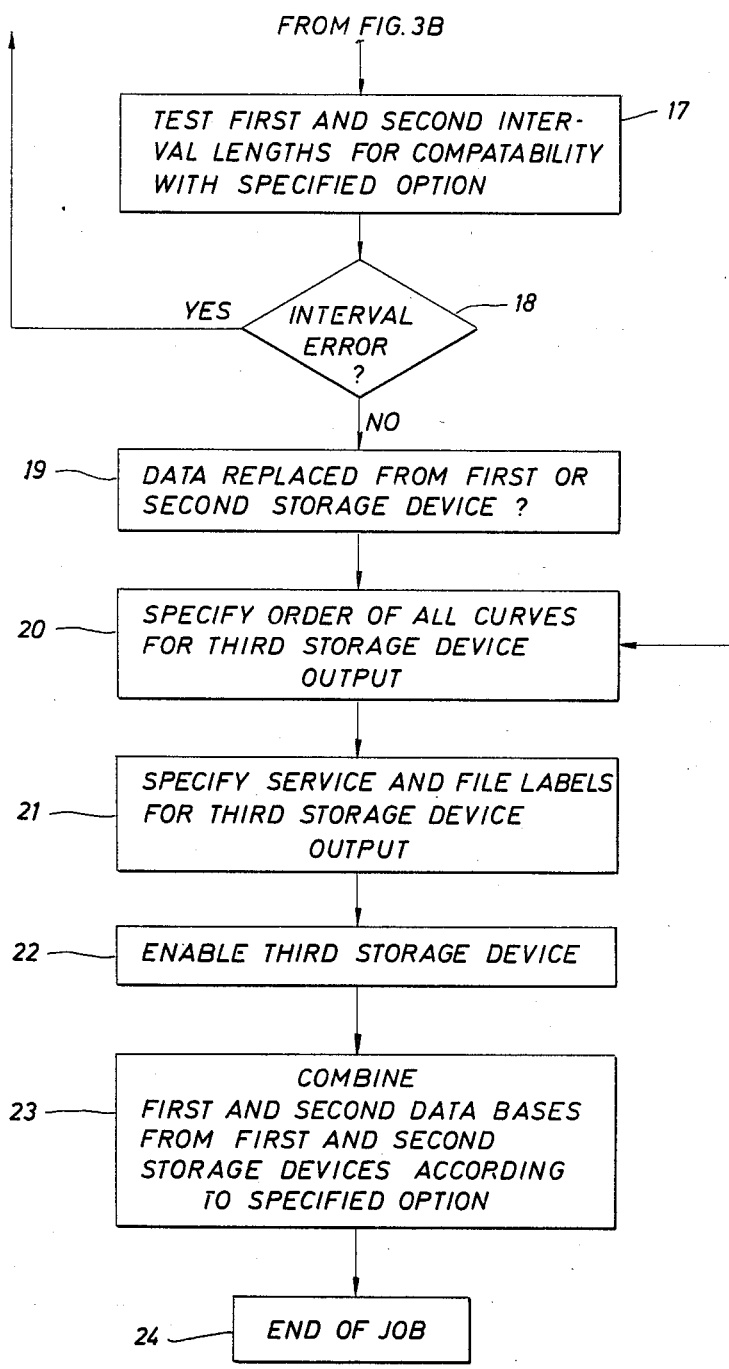

Referring now more particularly to FIG. 3, there will be seen a flow chart representing steps of the present invention preformed by the apparatus of FIG. 2 which are preferably implemented by a digital computer program or the like controlling the interaction of the various storage devices and input/output console.

It may be readily appreciated that the steps depicted in FIG. 3 may be implemented in a number of ways by one skilled in the art of digital computer programming and are thus intended to represent one particular embodiment of the present invention. Thus, for example, in the embodiment hereinafter described although various options and decisions may be provided to CPU 37 in response to user commands transmitted thereto by a logging engineer or the like by means of console 36, in other embodiments it may be preferable to automate such decisions under computer control, and thus a straight forward modification of the flow diagram of FIG. 3 and attendant modification of the corresponding digital computer program would be necessary.

Referring now to FIG. 3 with more particularity, and in accordance with the methods of the present invention, once the method commences, as represented by start block 1 of the flow diagram of FIG. 3, a first program query at block 2 seeks specification of the desired option or function, whether it be the merging, replacing, or splicing of data sets, or the reordering of data as previously described with reference to FIGS. 1A to 1F. While such specification may have been previously automatically selected, in a typical application a user will indicate at console 36 the desired option, at which time a next inquiry by CPU 37 in response to the digital program of the present invention will determine whether the reorder option was specified, as indicated in block 3.

It is a particular feature of the present invention to provide a generalized method of combining two data sets stored in respective storage devices into a composite third data set stored in a third storage device whereby the manner of such combination is selectively variable. However, because yet an additional feature, namely the reorder option, has been included for purposes of illustration but which in a preferred embodiment generally does not entail usage of the second storage device since generally only the reordering of curve data from one storage device or file is desired, for present purposes of illustration at block 3 it will be assumed that the reorder option has not been specified, but rather either the merge, replace, or splice option.

Still referring to FIG. 3, the first storage device 34 will thereafter preferably be enabled with the first data base to be combined, as indicated by block 4. Thus, as previously described, the first input tape will therefore be mounted on tape drive 34, and further in response to information provided through console 36, the tape will thereafter be indexed on the tape drive 34 to the desired position or file in which the first logging data set of interest is located.

At this point, either in automated fashion or in response to user input through console 36, the logging curves from the first data set which are desired to appear in the composite output are specified and renamed if desired. Thus, referring to FIG. 1A, at this point, if it was desired to merge logging curve A from the first data set with another logging curve of a second data set, the curve designation A would be received by the CPU 37.

At this point, the CPU 37 in response to digital program control, would preferably interrogate the disk storage 38 to determine the amount of storage available therein for transferring the data corresponding to the curves elected from the first data set in block 6 from tape drive 34 to disk drive 38. This step is functionally represented by block 7 and would typically comprise an automated determination of the storage space thus available in the disk drive 38.

At this point, it is necessary to determine what length of borehole data from the first set is of interest for merging, replacing, or splicing with respect to data from the second set. Accordingly, as represented by block 8, and either in automated fashion or in response to input from console 36, CPU 37 is thereby instructed as to a borehole interval length for which data corresponding thereto in the first data set will be transferred to the disk drive 38. For example, in the case of the merging of data in FIGS. 1A and 1B into the composite of FIG. 1C, at this point if it is desirable to merge data from the entire interval between 1,000 and 2,000 feet at which logging curve A was derived with data from the second data set, the 1,000 to 2,000 interval will be specified.

If it has also been specified, for example, that the logging curves A and B of the first data base of FIG. 1A are to be merged with logging curve D of the second data base of FIG. 1B, as shown in FIG. 1C, as indicated in block 9, the data corresponding to logs A and B in the 1,000 to 2,000 foot interval will thus be transferred from the tape drive 34 to the second storage device 38, as indicated in block 9 of FIG. 3.

Once the desired data from the first data base has thus been transferred, the digital tape of the second data base is thereafter loaded onto the first tape drive 34, as indicated in block 10, and the tape is thereafter automatically indexed to the appropriate file containing the curves of FIG. 2B in response to, for example, an input from the operator on the console 36.

Upon indexing to the appropriate file of the second data base in block 11, and in like manner to the specification step 6 with respect to the first data base, it is then appropriate to specify the logging parameter curves of the second data base which are to be consolidated with those of the first data base. Accordingly, as represented in block 12, at this point if the curves have not already been automatically identified, specification thereof may preferably take place by means of console 36 as well as any redesignating of the curve titles thereof as indicated in block 12.

It will be recalled from the preceeding discussion that in some instances depending upon which option of the present invention is selected, it is preferably that there either be identity or non-identity of selected curves for consolidation between those of the first data set and the second data set. More particularly, for example, in the replace option, it is desirable that at least one parameter curve selected from the first data set be identical with at least one such parameter curve selected from the second data set for consolidation, in that it will be recalled that in this option a portion of one curve is being replaced by that of another curve. Thus, there must be identity between at least one curve from the first data base and the second data base selected for consolidation.

Accordingly, as indicated in block 13, a test is preferably performed for detecting valid intersection of curve names between the first and second data sets according to the option specified or elected in block 2. As but another example, when the splice option is elected, logging data corresponding to one logging parameter derived over a first borehole interval is to be electronically spliced to logging data of at least the identical parameter derived over a next successive interval of borehole, usually during a second pass of the logging string through the borehole. Accordingly, it will be appreciated that in such instances, it is desirable that at least one logging parameter curve be selected from both data sets which is identical, and therefore the test at block 13 will also insure that this is the case when the splice option is elected.

As but a third example, in the instances when the merge option has been elected, it will be recalled that it is desired to combine or consolidate logging curves over at least the same borehole interval from two data sets wherein the logging curves from each set are not identical. This may occur, for example, when during one pass of the logging string through the borehole, one set of parameters is derived, and during a second pass through the borehole, another different set of parameters is derived, but wherein for further processing, analysis, and the like it is desirable to have a third output data base which combines or consolidates all such parameters.

Thus, in this option, it is preferably that duplicate logging parameter curves not be selected from both the first and second data sets, and thus the test in block 13 will insure this. As indicated in block 14, an error statement will preferably indicate to the operator by means of the console 36 when such intersection is improper, dependent upon the options specified. If such an error is detected, block 12 is again entered wherein a respecification of the desired curves from the second data set to correct the intersection error is permitted.

Still referring to FIG. 3, in accordance with block 15, the borehole interval length of data from the second data set which is desired to be transferred from the first tape drive to the second tape drive 35 is thence identified either automatically or through means of the console 36. If, for example, logging data corresponding to FIG. 1B resides in the first tape drive 34, logging data corresponding to FIG. 1A resides in the disc drive 38, and it is desirable to effect a merger therebetween, in accordance with block 15 the borehole increment length of 1,200 to 2,200 feet would be specified, indicating to the CPU 37 that data over this borehole increment in tape drive 34 from the second data set of FIG. 1B is to be merged with data from the first data set residing in the disc drive 38, and that this data over the 1,200 to 2,200 foot interval will appear in the output depicted in FIG. 1C in the third storage device or tape drive 35.

In like manner, if the data of FIG. 1B resides in the first storage device 34, the data of FIG. 1A resides in the second storage device 38, and it is desirable to replace data of curve A of FIG. 1A generated between the interval length of 1,500 to 1,700 feet with data of the identical logging parameter in curve A' of FIG. 1B also generated between the 1,500 to 1,700 foot borehole interval, as depicted in FIG. 1D, this interval of 1,500 to 1,700 feet will thus be specified in block 15.

As but a final example, if the splice option is elected, the data of FIG. 1B may reside in the first storage device 34 and the data of FIG. 1A in a second storage device 38, and it may be desirable to splice data of logging curve A' derived over the borehole interval of 2,000 to 2,200 feet with that of logging data from the first data set of FIG. 1A derived over the interval 1,000 to 2,000 feet. In this instance, in accordance with block 15, the borehole interval of 2,000 to 2,200 feet may be specified indicating that data of the second data set of FIG. 1B residing in the first storage device 34 will ultimately be transferred from the first device to the third storage device 35 and combine with the data of the first data set of FIG. 1A derived over the 1,000 to 2,000 foot interval, resulting in the composite spliced output log over the 1,000 to 2,200 interval stored in the third storage device 35, as depicted in FIG. 1E.

Again, for purposes of illustration, it has been assumed that the reorder option has not been specified, and thus block 16 will be by-passed and the flow diagram will proceed to block 17. As previously discussed, in some instances, and as a function of the option selected, it is preferable to have either identity or non-identity of parameter curves selected between the first and second data sets. It will also be appreciated that again, dependent upon the option elected, it may be preferable to have constraints relative to the borehole intervals over which data from the first and second data sets are selected for consolidation. More particularly, as previously described, an overlap of borehole interval over which data from the first data set and second data set were derived may be permitted in a merging option but not required in that logging curves corresponding to two or more different logging parameters are being merged into one output file. In like manner, when a replace option has been specified, because logging curve parameter data from one pass through the borehole is being utilized to replace data of an identical parameter over a selected borehole increment, in this instance an overlap of borehole intervals over which the data of the first and second data sets were derived would be normally required. Finally, in the case of the splice option, wherein logging data over one borehole interval is being spliced onto logging data from another borehole interval, in this instance, an overlap of borehole elevations at which data of the first and second data sets has been derived is generally not desirable.

Accordingly, block 17 is intended to represent functionally an automated test which may be performed to compare the borehole intervals specified with respect to the first and second data sets for consolidation, the test being for compatibility just described between the two specified intervals as a function of the option specified. In like manner to the error message of block 14, if an interval error is detected, such error may be indicated on the console 36, and if such error detected, the program is again routed to block 15 wherein a next attempt at specifying a compatible second interval length is permitted. If no interval error at block 18 is detected, the program is routed to block 19, at which an election is made, if the replace option is specified, to replace data residing in the first storage device 34 with that of the second storage device 38, or vice-versa. Thus, for example, with respect to FIG. 1A, B, and D, if logging data of log A' derived over a borehole increment of 1,500 to 1,700 feet and stored in the first storage device 34 (corresponding to line segment 41 of FIG. 1D) is desired to replace a corresponding segment between 1,500 to 1,700 feet of log A depicted in FIG. 1A and residing in the second storage device 38, at block 19, an election will be made to replace such data in the second storage device 38 with that of the first storage device 34.

Continuing with FIG. 3, as aforementioned, there is frequently convention in the industry as to the order of desired output curves, and, accordingly, the system of the present invention is provided at block 20 with means for specifying the order of all output log curves to be stored in the third storage device 35. Thus, in the case of FIG. 1C wherein curves A and B of the first data set of FIG. 1A are to be merged with curve D of the second data set of FIG. 1B, the order A, B, D may be specified, or, in the alternative, some other order such as B, D, A. Once the curve order has been specified, the desired service and file labels for the third storage device 35 are specified at block 21, whereupon the third storage device 35 is enabled at block 22 to permit storage therein of composite data from the first and second data sets being combined in accordance with the present invention and the elected option, as indicated in block 23. After all such data has been combined and stored in the third storage device 35, the process is completed as indicated by the end of job block 24.

It will be recalled that although a main feature of the present invention involves the provision of a general and flexible system having many elective options for combining two data sets into a third composite having a variety of forms, the ability for purposes of completeness and flexibility is desired to enable the reordering of curves from only one data set prior to being stored on the third output device 35 wherein, accordingly, a second data set is not required. Thus, referring to block 3, it may be seen that if the reordering option is specified, blocks 4–9 are bypassed which relate to setting up the first data base and transfer thereof to the second storage device. In like manner, with respect to block 16, it will be seen that if the reorder option is elected blocks 17–19 are bypassed which relate to compatibility testing between the first and second data bases which is not required when only one data base is utilized for reordering.

Referring now to FIG. 4, there is depicted therein an expanded view of the functions of the present invention performed by block 23 of the flow diagram of FIG. 3. Once the third storage device 35 is enabled at block 22 to commence the combination of data from the first and second data sets and storage thereof in the third device 35, block 23 is entered wherein the actual combination of data from the first and second data sets transpires. First, as indicated in block 25, a depth variable of the third storage device 35 is initialized corresponding to desired depth of the first data point of the composite log which will be output to the third storage device 35. For example, in the case of composite output logs depicted in FIGS. 1C–1F, this first initialized depth variable may correspond to the beginning depth of 1,000 feet.

Once this depth variable has been initialized, and assuming for example for illustrative purposes that a logging data set corresponding to FIGS. 1B and 1A reside in first and second storage devices 34 and 38, respectively, the system of the present invention will first determine, in accordance with block 26, whether a sample from the second data set of FIG. 1B resides in the first storage 34 corresponding to the 1,000 foot depth variable just initialized. In like manner, the system will determine, in accordance with block 27, whether a like sample from the first data set corresponding to FIG. 1A resides in its correlative second storage device 38 at the same depth. And, if so, in like manner to that of block 26, this sample will be retrieved.

The program will then branch to the appropriate option specified at block 2, namely merge, replace, splice, or reorder. These blocks are intended to functionally depict, in accordance with the option thus selected, what is done with the various logging curve samples retrieved from their respective storage devices as indicated in block 26 and 27. Specifically, with respect to the merge option, block 28 indicates that samples retrieved from the first and second storage devices 34 and 38 will be written to the third storage device 35. Referring to FIG. 1C, this corresponds to data samples from specified curves A and B of the first data set of FIG. 1A being retrieved according to block 26 and written to the third storage device 35 with a dummy variable for specified curve D from the second data set at the thousand foot interval. The depth variable, as indicated by block 32, is thereafter incremented by a preselected level spacing at which the next logging sample is to be retrieved. At block 33, a test is made to see if this incremented depth variable corresponds in depth to the last samples to be retrieved, and if not, samples at the next incremented depth are, in like manner to the previous samples, retrieved from first and second storages 34 and 38 and stored in the third storage device 35, as indicated by the recycling of the flow diagram of FIG. 4 to block 26.

This process continues with successive samples being retrieved from the first and second storage devices 34 and 38 and stored in the third storage 35 until the last such depth is reached. Referring for the moment to FIG. 1C, again, it will be seen that, for example, at the depth level of 1,500 feet, actual samples will be retrieved for logging curves A and B from the first data set and for logging curve D from the second set, and all three such curve data points will be stored on the third output storage 35. If it is specified that the A and B logging curves of FIG. 1A are to be merged with curve D of FIG. 1B, the depth variable will be incremented from 1,000 feet corresponding to the first samples of the first data set of FIG. 1A by a preselected amount until the samples derived at the level of 2,200 feet corresponding to the last sample of curve D of FIG. 1C are retrieved and thus stored, at which point the test of block 33 will indicate that the last depth has been reached, whereupon the end of job of block 24 is indicated.

In the case of specification of the replace option, as indicated in block 29 for each sample at the incremented depth intervals only the samples from either the first or second storage device 34 or 38 will be retrieved and stored in the third storage device 35, according to whether data has been specified to be replaced from the first or second storage device 34 or 38 as indicated in block 19. Aside from this difference, as with the other options of blocks 28–31, samples will continue to be retrieved and stored in the third storage device 35 until the last depth is reached as indicated in block 33.

With respect to the splice option and block 30, with reference to FIG. 1E, it will be recalled that data from either the first or second storage device 34 or 38 is first retrieved and stored in the third storage device 35 over a first depth interval (1,000 to 2,000 feet for logging curve A) and 2,000 to 2,200 feet for logging curve A'. Thus, with reference to block 30, data from either the first or second storage device 34 or 38 will be stored in the third storage device 35 dependent upon the depth of the particular sample. In other words, between the depth intervals of 1,000 to 2,000 feet, samples will be retrieved from whichever of the first and second storages 34 or 38 contains the data of logging curve A of FIG. 1A, and data will be retrieved from the remaining one of the first and second data storage devices 34 or 38 for the depth samples between 2,000 to 2,200 feet, this storage device having stored therein depth samples between that interval corresponding to the portion of logging curve A' of FIG. 1B between those intervals.

Again, for purposes of completeness, it will be recalled with respect to block 31 that a reorder function may be provided wherein curves from one data set may be reordered in terms of the order in which they will be stored in the third storage device 35. Accordingly, with reference to blocks 26, 27, and 31, samples will only be retrieved from the data set residing in the first storage device 34 and only these data points will be stored in the third storage device 35.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and sub-combinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

The embodiments of the invention in which an exclusive property or privilege is claimed are defined as follows:

1. A method for generating composites of digitized logging curve data from combinations of first and second logging data sets, each of said data sets representing at least one logging parameter curve, comprising:
    defining a plurality of combination functions including merge, replace, and splice;
    selecting one of said plurality of functions;
    selecting data in a first storage device corresponding to said at least one curve from said first data set;
    detecting from a second storage device a maximum borehole interval coresponding to storage available in said second storage device;
    selecting a first borehole interval length for each said selected data from said first data set;
    comparing each said maximum borehole interval with said first borehole interval length;
    retrieving from said selected data in said first storage device and storing in said second storage device logging data derived along said first borehole interval length when said length is equal to or less than said maximum borehole interval;
    selecting data in said first storage device corresponding to said at least one curve from said second data set;
    performing a first test for compatibility of each said selected data from said first data set with each said selected data from said second data set as a function of said selection of one of said plurality of combination functions;
    selecting a second borehole interval length for each said selected data from said second data set when said compatibility in said first test is detected;
    performing a second test for compatibility of each said first borehole interval length from said first data set with each said second borehole interval length from said second data set;
    defining the order of occurrence of said logging curve data comprising said composite;
    combining said data corresponding to said at least one curve from said first data set in said second storage device with said data corresponding to said at least one curve from said second data set in said first storage device as a function of said selection of one of said plurality of functions, said first and second borehole interval lengths, and said defined order of said logging curve data; and
    storing said combination of data in a third storage device.

2. The method of claim 1, further comprising:
    identifying each said at least one curve from said first and second data sets relative to a corresponding logging parameter represented thereby and wherein said performing said first test when said merge combination function is selected comprises:
        comparing said identifications of each said at least one curve from said first set to said identifications of each said at least one curve from said second set; and
        generating an indication of said compatibility when none of said identifications of said at least one curve from said first data set matches said identifications of said at least one curve from said second data set.

3. The method of claim 1, further comprising:
selecting one of said first and second data sets for replacement of said at least one logging parameter curve represented thereby by at least one logging parameter curve represented by a remaining one of said first and second data sets in response to selection of said replace function.

4. The method of claim 3, further comprising:
identifying each said at least one curve from said first and second data sets relative to a corresponding logging parameter represented thereby; and
wherein said performing said first test when said replace combination function is selected comprises:
comparing said identifications of each said at least one curve from said first set to said identifications of each said at least one curve from said second set; and
generating an indication of said compatibility when all of said identifications of said at least one curve from said first data set matches said identifications of said at least one curve from said second data set.

5. The method of claim 4, wherein said performing said second test when said replace combination function is selected comprises:
comparing each said first borehole interval length for each at least one curve from said first data set with each said second borehole interval length for each at least one curve from said second data set; and
generating an indication of said compatibility when all of said corresponding first borehole interval lengths are substantially identical to all said corresponding second borehole interval lengths.

6. The method of claim 1, further comprising:
identifying each said at least one curve from said first and second data sets relative to a corresponding logging parameter represented thereby, and
wherein said performing said first test when said splice combination function is selected comprises:
comparing said identifications of each said at least one curve from said first set to said identifications of each said at least one curve from said second set; and
generating an indication of said compatibility when at least one of said at least one curves from said first data set matches at least one of said identifications of said at least one curve from said second data set.

7. The method of claim 6, wherein said performing said second test when said splice combination function is selected comprises:
comparing each said borehole interval length for each said at least one curve from said first data set with each said second borehole interval length for each at least one curve from said said second data set; and
generating said indication of compatibility when none of said first borehole interval lengths overlap any of said corresponding second borehole lengths.

8. The method of claim 1, further comprising:
generating an error message when either said first or said second compatibility tests are negative.

9. The method of claim 5, wherein said combining step when said replace combination function is specified comprises:
deleting from said one of said first and second data sets data corresponding to said at least one logging parameter curve represented thereby derived over said first borehole interval length;
retrieving from said remaining one of said first and second data sets data corresponding to the same said at least one logging parameter curve represented thereby derived over said first borehole interval length; and
storing in said third storage device remaining portions of data from said one of said first and second data sets in correlation with said retrieved data from said remaining one of said first an second data sets.

10. The method of claim 1, further including:
generating an error message when said comparing each said maximum borehole interval with said corresponding first borehole interval length indicates at least one of said first borehole interval lengths is greater than said maximum borehole interval.

11. A method to be carried out with a digital computer under programmed control for automatic generation from first and second sets of logging data a plurality of composites of well logs, each said data set corresponding to at least one logging curve representative of a respective logging parameter, said method comprising:
loading a program for said programmed control into a second storage device;
defining a plurality of composite functions including the functions of merge, splice, replace and reorder;
selecting one of said plurality of composite functions;
loading stored data corresponding to said first data set into a first storage device;
specifying at least one said logging curve in said first data set in response to said selected function;
transferring said specified at least one said logging curve in said first data set to said second storage device;
loading stored data corresponding to said second data set into said first storage device;
specifying at least one said logging curve in said second data set in response to said selected function;
initializing depth variables functionally related to borehole depths at which at least one data sample in said first and second data sets were generated to an initial and final value;
retrieving a data sample defined at said initial value from said second storage device corresponding to said specified at least one logging curve in said first data set;
retrieving a data sample defined at said initial value from said first storage device corresponding to said specified at least one logging curve in said second data set;
storing at least one of said retrieved data samples in a third storage device as a function of said selected one of said composite functions;
incrementing said initial value to a new value; comparing said new value and said final value;
repeating said retrieving, storing, incrementing, and comparing steps until said new value equals said final value; and
specifying an order of appearance for said well logs in said composites, and wherein said storing at least one of said retrieved data samples in said third storage device is in functional relation to said specified order.

12. The method of claim 11, further including:

testing compatibility between said specified at least one curve in said first data set and said specified at least one curve in said second data set prior to said initializing said depth variables.

13. The method of claim 12, wherein said testing step comprises:
    testing for compatibility between said respective logging parameters of said specified at least one said logging curve in said first data set and said specified at least one said logging curve in said second data set.

14. The method of claim 13, wherein said testing step further comprises:
    testing for compatibility between first borehole intervals over which said specified at least one said logging curve in said first data set was derived and second borehole intervals over which said specified at least one said logging curve in said second data set was derived.

* * * * *